Patented Dec. 20, 1932

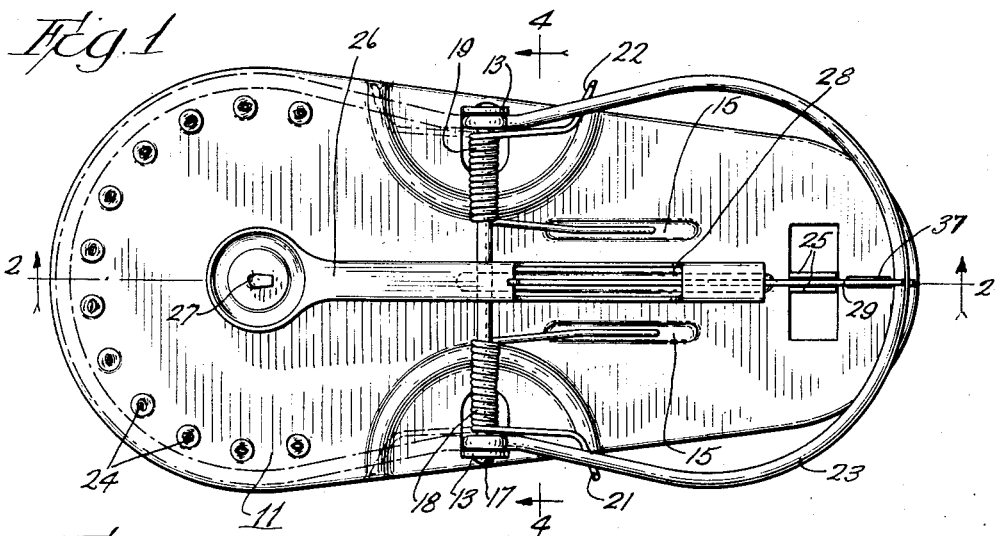

1,891,737

UNITED STATES PATENT OFFICE

HERBERT A. STILSON, OF CHICAGO, ILLINOIS

ANIMAL TRAP

Application filed March 2, 1928. Serial No. 258,516.

This invention relates to animal traps of the spring jaw type, commonly known as mouse traps. It is an object of this invention to provide an improved trap which may be cheaply and economically made from metal.
Another object of my invention is to provide an animal trap of novel construction wherein the jaw is held in position by a bait-controlled latch, which in no way interferes with the jaw as it swings to a closed position.
Another object of my invention is to provide an animal trap having a relatively strong spring-operated jaw, releasable by a minimum of movement of the bait latch mechanism.
Another object of the invention is to provide a free latch member which will positively hold the jaw in set position until released by movement of the bait treadle.
Another object of the invention is to provide a trap which may be set by merely moving the spring-operated jaw into engagement with the latch.
A further object of the invention is the provision of a bait treadle located substantially at the center of the closed position of the jaw.
Numerous other objects and advantages of the invention will be apparent as it is better understood from the following description, which, taken in connection with the accompanying drawing, discloses a preferred embodiment thereof.
Referring now to the drawing, Figure 1 is a plan view of my improved trap, showing the jaw in set position;
Fig. 2 is a cross-section taken substantially along the line 2—2 of Fig. 1;
Fig. 3 is a similar trap to Fig. 2, showing various parts in different positions after the trap has been sprung;
Fig. 4 is a cross-section taken along the line 4—4 of Fig. 1; and
Fig. 5 is a cross-section taken along the line 5—5 of Fig. 3.
In detail, my improved trap consists of a base 11 having a depending peripheral flange 16 preferably made from sheet metal. In contour this base is substantially ovate in shape, the large end being slightly larger than the spring-operated jaw which conforms to the shape of this large end.
At approximately the mid length and extending toward the small end and positioned at the approximate transverse center of the base, a depression 12 is formed to provide a recess for the latch member, to be described later, when it is in an inoperative position. Upstanding ears 13 are formed at each side of the base from the material of the base and have punched holes to receive a pin 17. A curved rib 14 is formed about each of the ears to reinforce the metal at this point. Grooves 15 are formed adjacent the central recess and on either side thereof and extend a substantial distance therealong.
Upstanding lugs 25 are formed from the base 11 rearwardly from the central depression to form guides for the latch. An aperture 37 is formed to the rear of these lugs in the base and forms a pivot point for the latch in a manner to be described later. The pin 17 is positioned in the upstanding ears 13 and riveted at its outer ends to prevent its axial movement. A pair of coil springs 18 and 19 are mounted upon this pin substantially adjacent the ears, each having an extension 36 resting in the grooves 15 previously described. Each also has an extended portion formed into hooks 21 and 22, respectively, engaging the jaw member 23 so as to continuously urge it to a sprung or closed position. The jaw member 23 is substantially semi-circular in shape and is rotatably mounted upon the pin 17 between the spring members and the upstanding ears.
A plurality of upstanding portions or buttons 24 are formed spaced about the periphery of the large end of the base, being positioned to lie within the jaw member 23 when in the sprung position. These projections impale the trapped animal as the jaw is sprung and prevent movement along the jaw.
The tripping member is comprised of a bait treadle 26 and a latch member 29. The bait treadle is preferably formed from a single piece of sheet metal and has a major portion bent to a U-shape. At one end a flat bait pan 27 is formed which has a projecting hook at its center to engage the bait, preventing its removal and insuring movement of the treadle when the bait is molested. The treadle is mounted near its center upon the pin 17 near the center of the pin. A slot 28 is formed for a substantial distance along the top of the rear portion of the treadle. This rear portion is heavier than the bait-holding or front portion and tends to keep the treadle in substantially the position shown in Figs. 3 and 4.

A latch 29 is also preferably formed from one piece of metal and comprises an elongated strip having a portion 31 at one end cut to form a cam which permits it to slightly move the treadle so that the trap may be set. At the other end a shoulder 32 is formed providing an enlarged under portion and two notches 33 and 35 are cut in the extremity of this enlarged portion. The lower notch 33 engages a lip formed by the aperture 37 previously described providing a limited pivot for the operation of the latch. The notch 35 is formed with a shoulder 38 at its under side completing this shaped end of the latch for cooperating with the slot in the base to provide a directional bearing for the latch and is the means provided to catch and hold the jaw 23 when the trap is set. When the jaw is closed the parts are in the position shown in Fig. 3. To set the trap, the jaw 23 is rotated about its axis on the pin 17 until it engages the shoulder 38 in the latch. Further movement of the jaw forces the shoulder downwardly and the cam end 31 upwardly. The cam rides past the slot 28 in the treadle to a position above the treadle as shown in Fig. 2. This same action firmly engages the jaw 23 into the notch 35, the jaw pressing against the upper side of the notch. When the jaw is released, it is urged upwards against the upper side of this notch and due to the pivot action of the notch 33 urges the other end 31 of the latch downward, but since this end 31 is engaged above the treadle no movement is permitted and the jaw is held in an open position. This is clearly illustrated in Fig. 2. However, depressing the bait pan on the treadle releases the latch from engagement above the treadle, and due to the urging by the jaw the latch is quickly rotated downward into the recess 12. This movement is sufficient to release the jaw 23 from the notch 35 and the trap is sprung.

It is thought that this invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:
1. An animal trap comprising, a base, a spring actuated jaw and a bait holding treadle, both pivoted on the base for concentric movement, and a latch interlockingly engaged with said base and restraining movement of said jaw under control of said bait treadle, the interlocking connection between said base and latch comprising slotted inter-engaged portions of said latch and base brought into registration by projection of the latch through the base.

2. An animal trap comprising, a base having a central recess and a pivot shaft arranged generally above said recess, a spring-pressed jaw and a bait holding treadle pivoted upon said pivot shaft, a latch for controlling said jaw and engageable with said bait holding treadle, a free end of said latch being arranged for positioning in said recess.

3. An animal trap, comprising a base, a spring actuated jaw, a bait holding treadle pivoted on the base and having a latch engaging part arranged on the opposite side of the pivotal axis of the member from the bait holding portion of the treadle, and a latch member movable about a fixed axis having an end for engagement with said treadle and having a pair of notches at its opposite end, the lower of said notches providing for pivotal mounting on the base with the upper of said notches arranged for holding engagement with the spring actuated jaw to arrange the trap in set condition.

4. An animal trap, comprising a base, a pivoted spring actuated jaw, a bait holding treadle pivoted on the base and having a bait holding part on one side of its axis and a counter-balancing part on the other, and a latch movable about a fixed axis located at the rear of the base and having a notch to engage said jaw, and an end underlying the counter-balancing part of said treadle when the trap is in released position and movable up to tilt the treadle as the trap is set to press the said treadle in the direction of the action of gravity.

HERBERT A. STILSON.